(12) United States Patent
Farrell

(10) Patent No.: US 7,093,529 B2
(45) Date of Patent: Aug. 22, 2006

(54) COMPOSITE PISTON

(75) Inventor: Robert G. Farrell, Franklin, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 16 days.

(21) Appl. No.: 10/964,749

(22) Filed: Oct. 14, 2004

(65) Prior Publication Data

US 2006/0081125 A1    Apr. 20, 2006

(51) Int. Cl.
*F16H 19/00* (2006.01)
(52) U.S. Cl. ..................... 92/255; 29/888.04
(58) Field of Classification Search .............. 92/71, 92/172, 175, 255; 29/888.044, 888.042, 29/888.04

See application file for complete search history.

(56) References Cited

U.S. PATENT DOCUMENTS

| | | | |
|---|---|---|---|
| 6,146,727 A | 11/2000 | Dannels | 428/36.4 |
| 6,339,984 B1* | 1/2002 | Sugioka et al. | 92/248 |
| 6,530,149 B1 | 3/2003 | Sugiura et al. | 29/888.042 |
| 6,532,655 B1 | 3/2003 | Ahn et al. | 29/888.042 |
| 6,546,841 B1 | 4/2003 | Kato et al. | 92/71 |
| 6,589,021 B1 | 7/2003 | Kato et al. | 417/222.2 |
| 6,604,284 B1 | 8/2003 | Kato et al. | 29/888.043 |
| 6,739,236 B1* | 5/2004 | Kato et al. | 92/71 |
| 2002/0117537 A1* | 8/2002 | Kato et al. | 228/114.5 |

* cited by examiner

*Primary Examiner*—Thomas E. Lazo
(74) *Attorney, Agent, or Firm*—Brooks & Cameron, PLLC

(57) ABSTRACT

Devices, piston components, and methods are provided for an improved piston. One embodiment for a piston component includes a base having a side to receive a piston body. A tang is provided to the base and extends outward from the side of the base which is to receive the piston body.

46 Claims, 7 Drawing Sheets

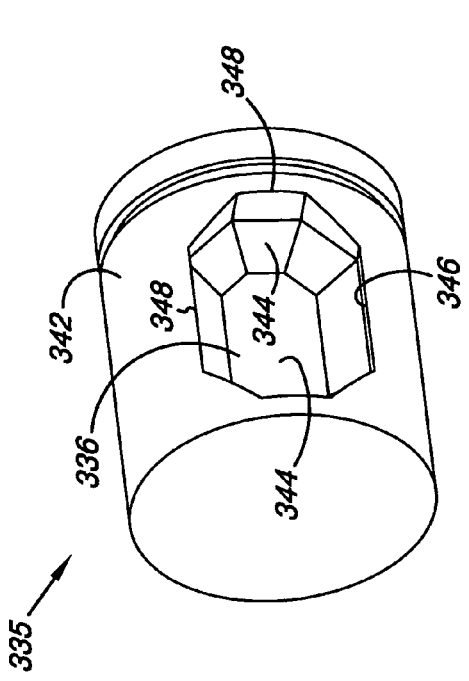
Fig. 3A
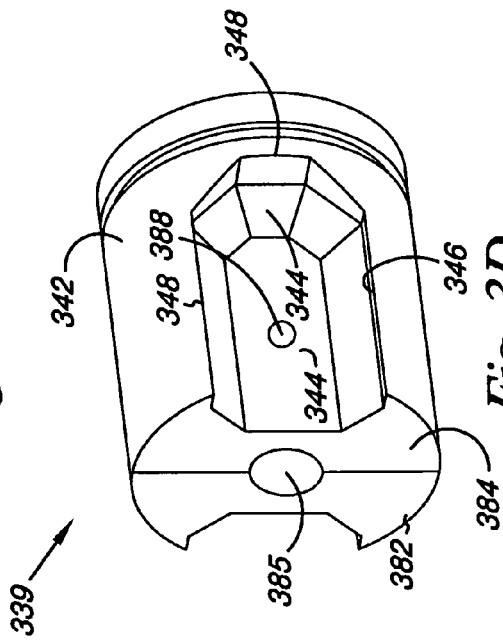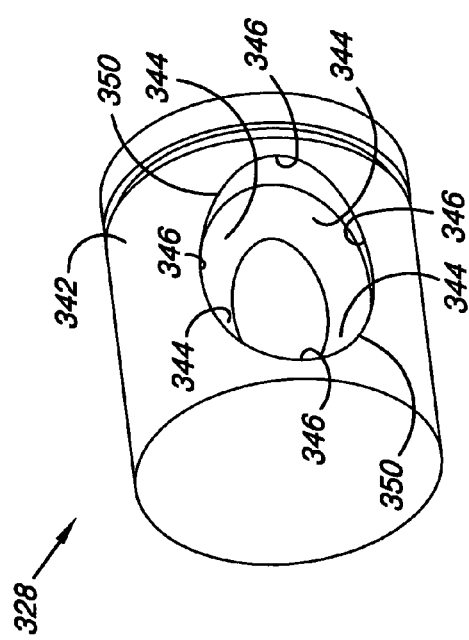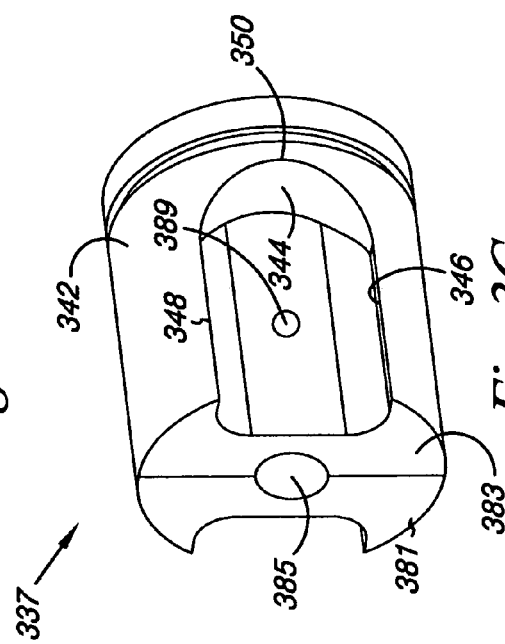
Fig. 3B
Fig. 3C
Fig. 3D

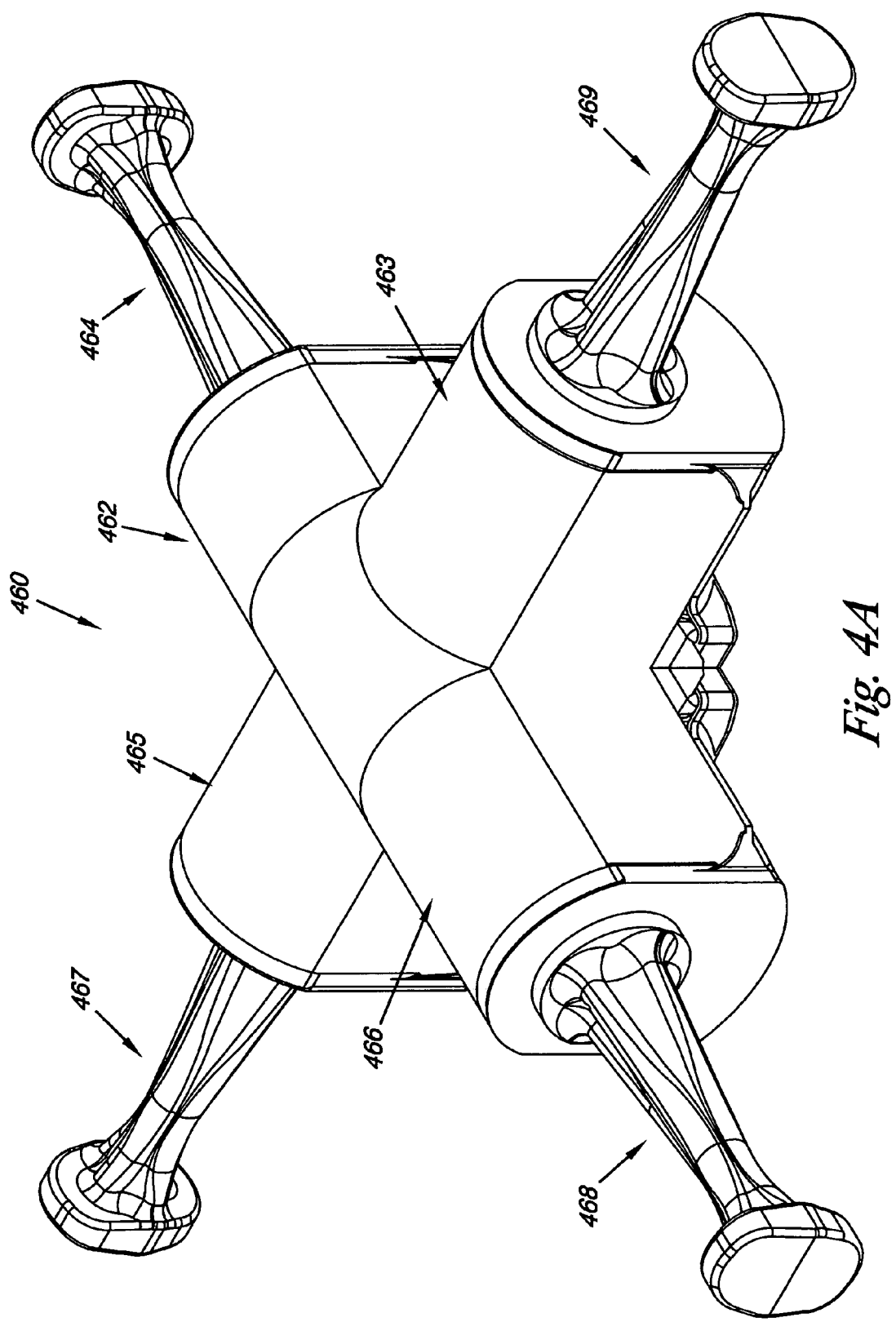

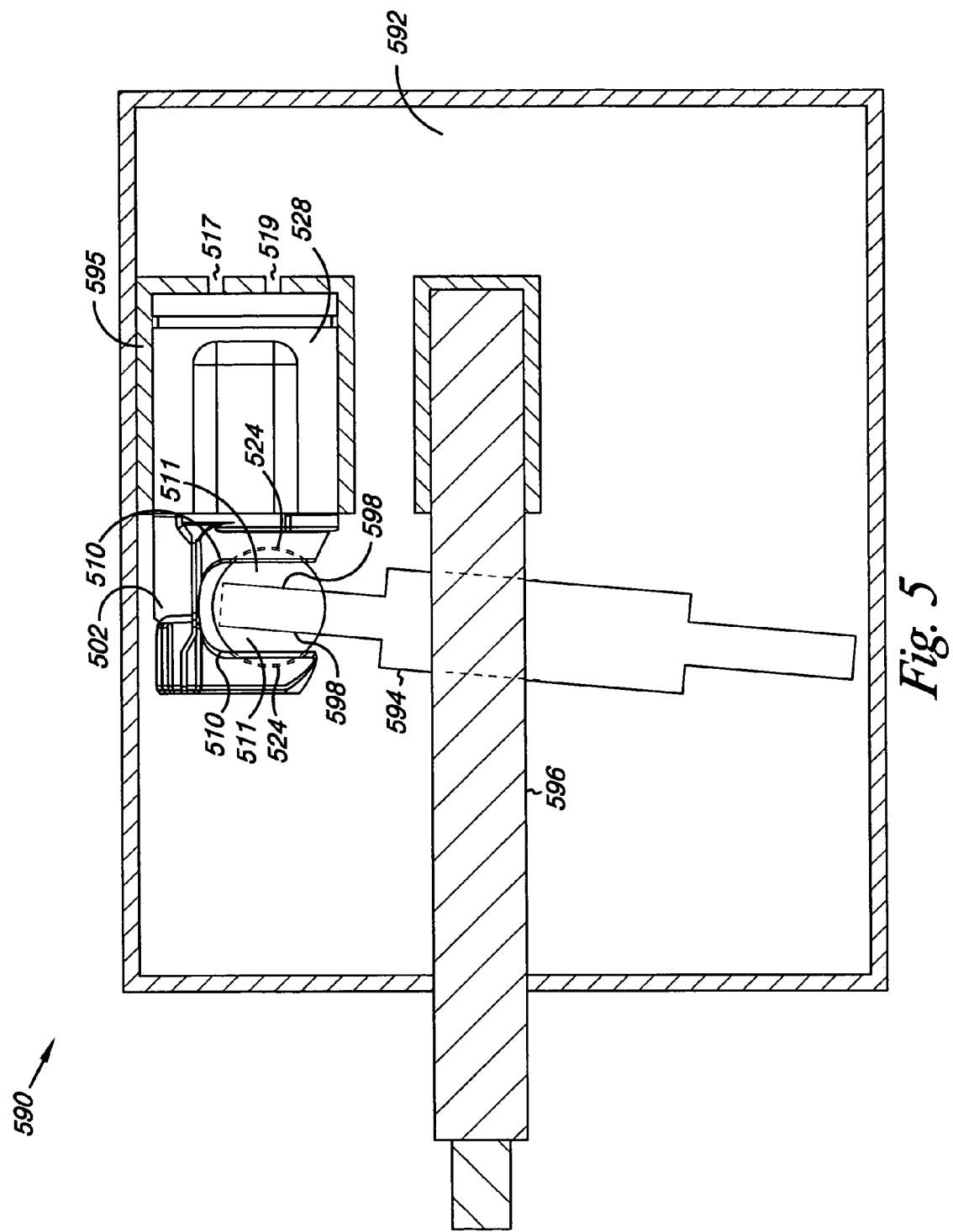

COMPOSITE PISTON

INTRODUCTION

Pistons are devices used to compress fluids and gases within a confined area. They can be used, for example, in heating and cooling systems to compress air or coolant or can be used in engines to aid in combustion. Pistons typically reciprocate within a chamber such as a piston cylinder, e.g., a cylindrical chamber, wherein the gas or fluid is forced into or drawn into the chamber and then the piston is moved to change the volume within the chamber, for example, compressing the material therein. A piston can include a yoke and a piston body integrally forged thereto or crimped to the yoke in some manner. In this example, the yoke is used to control the movement of the body. The body is used to seal the chamber such that material within the chamber cannot escape when the compression takes place.

Pistons can be formed from a single material, such as a metal or polymer, but often times, a combination of materials can produce better results. For example, metals provide some strength and wear resistance. However, solid piston bodies may be too heavy and/or costly to manufacture for some applications and hollow alloy piston bodies, crimped to a piston base, e.g., a yoke, may evidence unacceptable wear and/or leakage. Polymers may be used to provide lighter weight piston bodies. Piston combinations having a metallic yoke and a hollow polymer piston body have been devised. These designs involve crimping or bonding the hollow polymer piston body onto the end of the yoke. Still, such configurations have been prone to forming leaks which allow the material within the chamber to escape or to flow into the hollow piston body.

An air conditioning (A/C) compressor is one example of a device which may use pistons. An A/C compressor is the main part of the condensing unit of an air conditioning system. Working like an engine, the compressor may use a hollowed metal piston to compress a refrigerant from a gas to a liquid and then back to a gas. The compression and movement of the piston can create a high temperature and high impact environment. In such environments, the piston can have a tendency to wear and/or leak refrigerant when the refrigerant is in a liquid state and/or gas state. For instance, A/C compressor pistons that are crimped and/or bonded can become deformed and/or cracked, and thus, leak due to the high temperature and/or high impact environment in which these pistons operate.

BRIEF DESCRIPTION OF THE DRAWINGS

FIGS. 3A–3D illustrate various additional embodiments of piston bodies which can be over molded and/or attached onto tang embodiments described herein.

FIGS. 4A–4D illustrate various embodiments for a piston manufacturing assemblage including a tang according to embodiments of the present invention.

FIG. 5 illustrates example of a device in which a piston component including tang embodiments described herein can be used.

DETAILED DESCRIPTION

Embodiments of the present invention include devices, piston components, and methods associated therewith for improved piston operation. As will be described herein, a piston component is provided with a tang to receive a piston body. The tang is provided to a base structure, such as a yoke, which becomes associated with the piston body. However, embodiments are not limited to piston components having a yoke. The base has at least one side intended to receive the piston body. According to various embodiments, the tang extends outward from the side which is to receive the piston body. The tang can extend outward from this side in a perpendicular manner or at an angle. The piston body is formed to the tang.

In various embodiments the piston body includes a moldable material such as a plastic, and is over molded to the tang. Embodiments, however, are not limited to an over molding process. That is, in some embodiments the piston body can be formed in halves or other sections, e.g., sectional portions, and attached to the tang using a fastener such as a screw, adhesive, etc. In some embodiments the piston body is a thermoset composite which includes at least one of: a phenolic, an unsaturated polyester, and a vinyl ester. In some embodiments the piston body is a thermoplastic material.

The tang can be integrally formed with the base, e.g., through forging, casting, machining, etc. As one of ordinary skill in the art will appreciate upon reading this disclosure, having the base and the tang integrally formed can beneficially provide for a streamlined manufacturing sequence, saving manufacturing time and costs. According to various embodiments, over molding the piston body to the tang can additionally reduce manufacturing steps in comparison to the previously used approaches of crimping, bonding, etc, the piston body to the base. Again, this has the benefit of reducing the manufacturing costs and time. An over molded piston body will also help to increase piston performance in terms of mechanical stability and distribution of forces in piston operation.

Figure 1A:
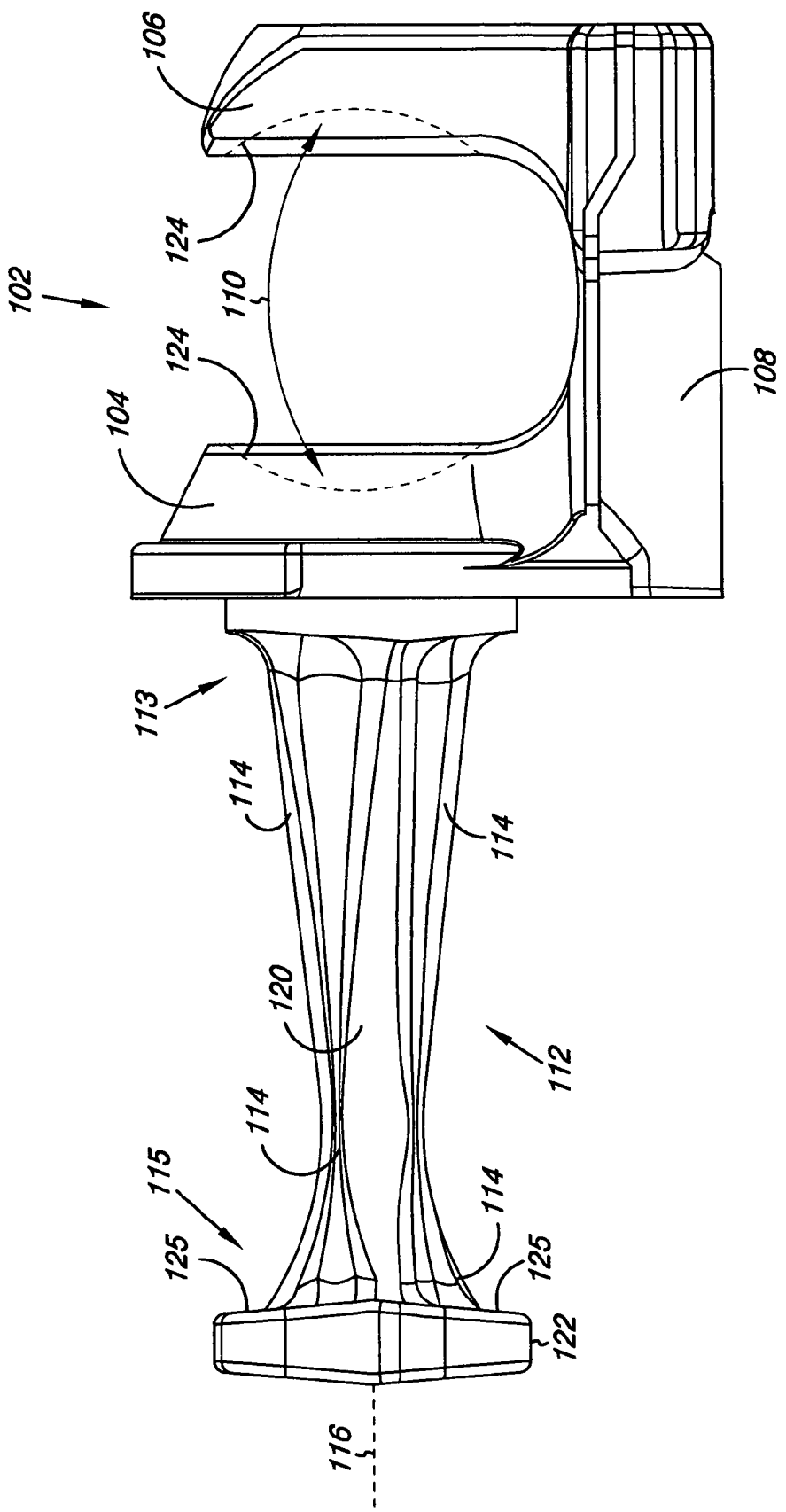
FIG. 1A illustrates a piston component including one embodiment of a tang according to the teachings of the present invention.

FIG. 1A illustrates a piston component having a base 102 and a tang 112 according to one embodiment of the present invention. In embodiment of FIG. 1A, a yoke, as the same is known and understood by one of ordinary skill in the art is illustrated as the base 102. Embodiments, however, are not limited to this example of a yoke as the base structure 102. Embodiments herein are discussed in connection with a yoke as the base structure 102 for ease of illustration. Those in the art appreciate that the yoke 102 can be attached to a piston body (not shown in FIG. 1A) which can be slidably fitted within a cylinder bore (i.e., cylindrical chamber) of a housing (not shown). Those in the art will further appreciate the various means that can be associated with the base structure 102 to move a piston body. For example, in the yoke 102 scenario a swash plate (not shown) can engage the yoke to produce a reciprocating motion of the piston body within the cylinder bore of a device such as an A/C compressor.

In the example embodiment of FIG. 1A, the yoke 102 is illustrated to include a first arm 104 and a second arm 106 connected via a member 108. The first arm 104 and the second arm 106 can be of various lengths, widths, sizes, etc. In the example of FIG. 1A, the first arm 104 and the second arm of the yoke 102 includes recesses 110. The shape of the inner surfaces 124 of the recesses 110 can provide for the fitment of shoes (not shown), which can be used to provide a gripping force for a swash plate. The recesses 110 can be formed on opposing sides of the arms 104 and 106 at various locations and be of various shapes. The same is not described in more detail here so as not to obscure embodiments of the invention.

As mentioned above, embodiments provide a tang 112 which extends from a side of the base 102 to receive a piston body. As the reader will appreciate, more than one tang 112 can be provided extending from the side of the base 102. In the example illustration of FIG. 1A, the tang 112 extends from the first arm 104. The tang can be provided in various shapes, dimensions, materials, etc. For example, the tang 112 can have various cross-sectional shapes, lengths, diameters, and the like (e.g., geometries), to receive a piston body. And, in various embodiments having more than one tang, the multiple tangs can have different geometries from one another. In various embodiments, the yoke 102 and the tang 112 can be formed of various polymers, metals, including metal alloys, and other suitable materials. In the example illustration of FIG. 1A, the tang 112 extends outwardly in a perpendicular orientation to a major surface of the first arm 104. However, embodiments of the invention are not limited to this illustrated orientation. That is, in some embodiments, the tang 112 can also be oriented at an angle non-perpendicular to a surface of the first arm 104 as suited to the particular distributional forces and mechanical design rule of a given use or application for a piston configuration. By way of example, and not by way of limitation, in some embodiments, the tang 112 can extend at an angle in a range of 8 degrees to 18 degrees from perpendicular orientation with the major surface of the first arm 104 such as may be suited for use with the swash plate scenario in application with an A/C compressor.

As mentioned above, the tang 112 can be integrally formed with the base 102, e.g., through forging, casting, machining, etc. Having the base and the tang integrally formed can beneficially provide for a streamlined manufacturing sequence, saving manufacturing time and costs. More on this point is provided in connection with FIGS. 4A–4D. Embodiments can also include a tang 112 which is hinged to the base structure 102. As one of ordinary skill in the art will appreciate upon reading this disclosure, a hinged connection to the base structure 102 can afford a degree of adjustability to angle the tang 112 as suited to the particular distributional forces and mechanical design rule of a given use or application for a piston configuration. In some embodiments the tang 112 can have a threaded portion along its length to receive a piston body. Embodiments such as these as well as other tang 112 arrangements are considered within the scope of the present invention.

In various embodiments of the present invention, the tang 112 can include at least one spline 114 extending longitudinally along a portion of the tang 112. Embodiments of the invention are not limited to a tang 112 including a spline 114. For example, in some embodiments the tang 112 may have a cylindrical or rod shape. As used herein, a spline 114 is a groove or channel on the tang 112. For example, a tang 112 can have a spline 114 extending between the yoke 102 or location proximal the yoke 102 along a longitudinal axis 116 of the tang 112 and a distal end 115 of the tang 112. In some embodiments, the tang 112 can include a number of splines 114 extending longitudinally along a portion of the tang 112 as illustrated in FIG. 1A. Thus, in various embodiments, the tang can include various lengths, and the splines can be longitudinally aligned and include lengths equaling the length of the tang or the splines can include differing lengths than the length of the tang.

As stated, splines 114, if used, can be formed of varying shapes and sizes. Forming splines having various shapes and sizes can define various cross-sectional geometries of the splines. The use of varying shapes and sizes of the splines can, for example, provide for a tang 112 having similar and/or different cross-sectional geometries along its length. The similarities and/or differences in the cross-sectional geometries can be based on one or more desired functions to be elicited from the tang. That is, the tang 112 can similarly include circular discs attached thereto of a different diameter that the majority of the tang's length, again as suited to the particular distributional forces and mechanical design rule of a given use or application for a piston configuration.

The various geometries described herein can provide for a rotational grip for a piston body as well as a longitudinal grip for the piston body. As used herein, rotational grip and a longitudinal grip are intended to mean a gripping force or friction imparted by surface features, such as a spline, disc, indentation, etc., of the tang 112 on a piston body that is formed to the tang. With regard to rotational grip, the various geometries can provide surfaces of the tang such that a rotational movement of the piston body with respect to the tang is precluded. With regard to longitudinal grip, the various geometries can provide surfaces of the tang which preclude the piston body from moving longitudinally with respect to the tang.

As indicated, examples of cross-sectional geometries can include, but are not limited to: elliptical, convex, crossed, concave, semi-circular, circular, T-shaped, I-shaped, irregular, and polygonal cross-sections. In addition, these cross-sectional geometries can include various widths along the length of the tang. For example, as illustrated in FIG. 1A, the cross-section of the tang includes a greater width at a proximal end 113 of the tang than at a distal end 115 of the tang 112.

Figure 1B:
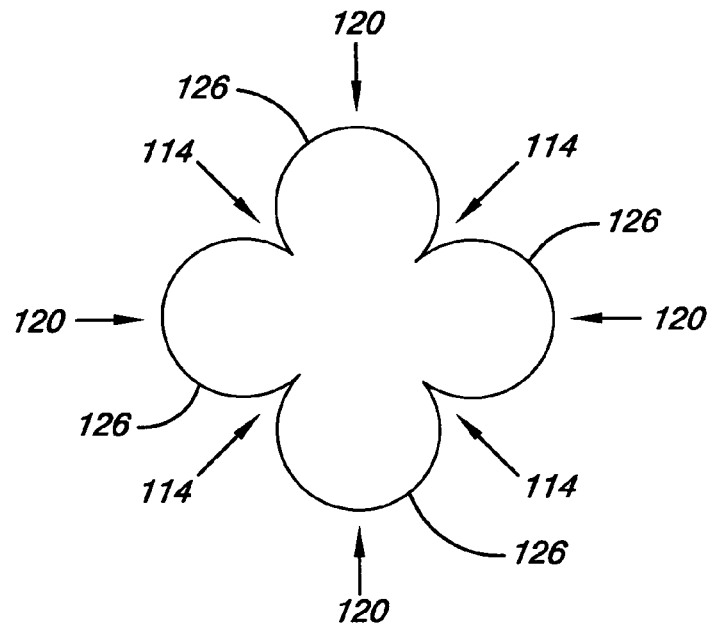
FIG. 1B illustrates one embodiment of a cross section view of a tang.

In the example embodiment illustrated in FIG. 1B, the tang 112 includes a cross-sectional geometry having a crossed shaped cross-section. Embodiments are not limited to this example. In the example embodiment of FIG. 1B, the cross-sectional geometry of the tang 112 includes four splines 114. In the embodiment shown in FIG. 1B, the four splines extend longitudinally along the tang 112 to define the crossed shaped cross-sectional geometry along the length of the tang. And, as discussed above, the width of the cross-sectional geometry can vary along the length of the tang. The four splines 114 can each define a surface 120 between each spline. In the embodiment shown in FIG. 1B, the surface defined between each spline 114 includes a semi-circular surface 126. In some embodiments, the semi-circular surfaces may help to prevent the piston body from rotationally moving with respect to the tang. Utilizing a number of different widths along the length of the tang may also help to prevent both rotational and longitudinal movement of the piston body along the tang.

Referring again to FIG. 1A, in some embodiments, the tang 112 can include a lug 122 positioned along the tang 112. The lug can be of any shape. For example, in the embodiment shown in FIG. 1A, the lug 122 is positioned at the distal end 115 of the tang 112 and includes an ovular shape having curved surfaces along the circumference of the lug.

In various embodiments, the lug 122 can include inner and outer surfaces. These surfaces can provide additional longitudinal grip for the piston body. For example, the inner surface 125, shown in FIG. 1A can function like a barb, thereby preventing the piston body from sliding along the longitudinal axis 116 from the proximal end 113 toward the distal end 115 of the tang 112. The lug 122 and/or the tang 112 can further have a rotational orientation relative to a side or edge of a major surface of the base structure 102, e.g. the first arm, again as suited to the particular distributional forces and mechanical design rule of a given use or application for a piston configuration.

Figure 2:
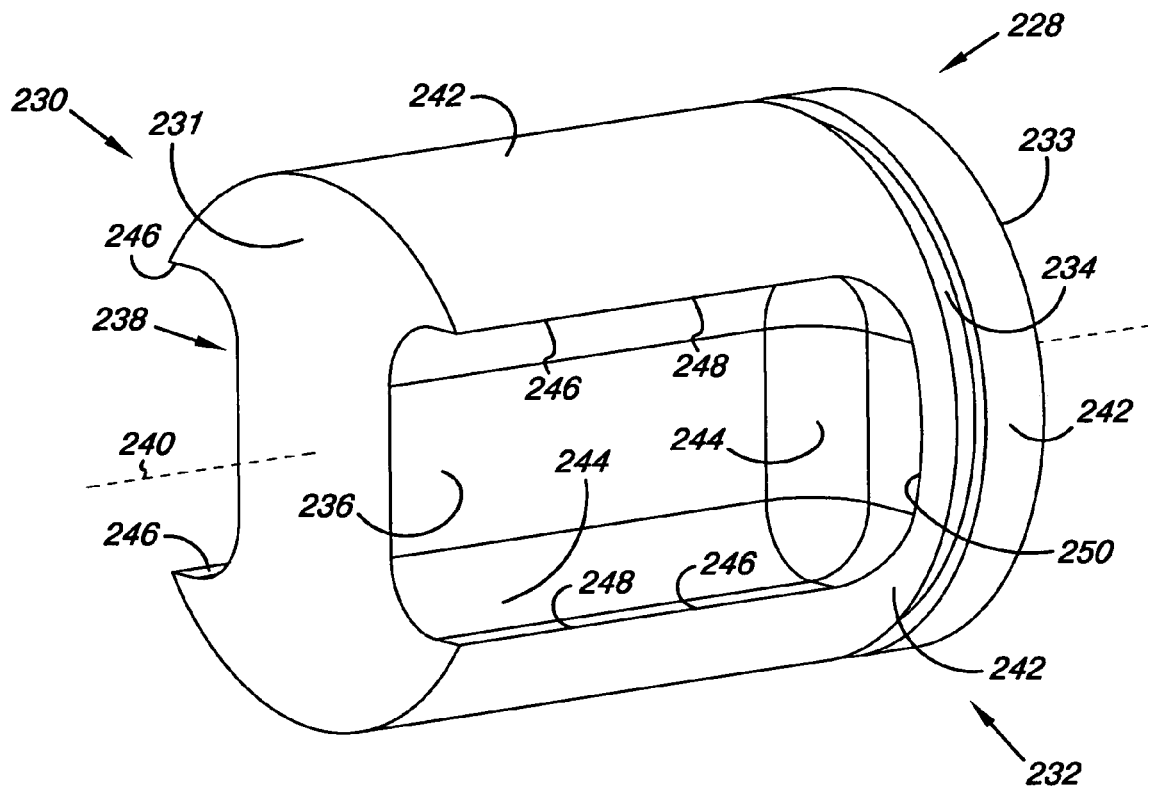
FIG. 2 illustrates an embodiment of a piston body which can be overloaded onto tang embodiments of the present invention.

In FIG. 2, an embodiment of a piston body 228 of the present invention is illustrated. In various embodiments, a piston body is formed onto the tang using a moldable material. As mentioned above, the piston body 228 can be formed of various materials including plastic. That is, the piston body 228 can be a thermoset material. The piston body can also include a thermoset plastic, a thermoset composite, and/or a composite of a thermoplastic and a thermoset. One of ordinary skill in the art will appreciate that thermoplastics are plastics capable of being repeatedly softened by increases in temperature and hardened by decreases in temperature. With thermoplastics such changes are physical rather than chemical. One of skill in the art will further appreciate that a thermoset material is a material that will undergo or has undergone a chemical reaction by the action of heat, catalysts, ultraviolet light, etc., leading to a relatively infusible state. Embodiments are not limited to these examples.

For illustration, the piston body 228 embodiment of FIG. 2 is discussed herein in association with a moldable material such as can be molded to the tang embodiments described above. Moldable materials can include, but are not limited to, polymers such as thermoplastic and thermoset composite materials. Thermoset composite materials include phenolics, polyesters, and vinyl esters.

More particularly, FIG. 2 is discussed, by way of example and not by way of limitation, as an embodiment for a piston body 228 that includes a phenolic thermosetting material which can be over molded to the tang embodiments described above. Embodiments, however, are not limited to these examples. For instance, the piston body could include a body formed using a liquid resin system (LRS) as the same will be understood and appreciated by one of ordinary skill in the art. One of ordinary skill in the art will appreciate the various molding processes which can be used to associate a piston body to a tang according to the embodiments described herein. That is, molding processes can include hand lay-up, spray up, resin transfer molding, pultrusion, compression molding, transfer molding, injection molding, etc., as the same will be known and understood to one of ordinary skill in the art. Over molding, as used herein, is intended to include the use of one or more of these molding processes to mold a material over another component.

As used herein, a thermoset composite is a composite material containing a thermosetting polymeric matrix, such as an epoxy or polyester, and a reinforcement material. Thus, a thermoset composite can include a thermosetting resin, reinforcement material, and/or fillers. Thermosetting a resin can include cross-linking the resin with a reinforcement material and/or a filler to polymerize the resin and reinforcement material and/or filler to a permanently solid and infusible state. Cross-linking the thermosetting resin with reinforcement material and/or fillers can provide the ability to modify the thermoset composite's physical, mechanical, and/or thermal characteristics.

Phenolic thermoset composites have the ability to withstand high temperature and mechanical loads with minimal or no deformation. In other words, phenolic resins can provide strength and rigidity to maintain structural integrity and dimensional stability of the piston body in high temperature and high impact environments.

In some embodiments, the piston body can include a phenolic thermoset composite that includes a phenolic resin, a reinforcement material, and/or a filler as described above. As used herein, a reinforcement material is a strong, inert woven and/or nonwoven fibrous material incorporated into the matrix of the thermoset composite to improve its physical properties. In various embodiments, reinforcement materials can include, but are not limited to, boron, carbon, metal glass and ceramic fibers, flock, graphite, jute, sisal and whiskers, chopped paper, macerated fabrics, and synthetic fibers, among others. A filler is a relatively inert material added to a resin to alter its physical, mechanical, thermal, or electrical properties. Fillers can include, but are not limited to, organic and inorganic materials, clays, silicates, talcs, carbonates, asbestos fines and paper, among others. Some fillers can act as pigments, e.g., carbon black, chalk and titanium dioxide; while others such as graphite, molybdenum disulfide and PTFE can be used to impart lubricity. Other fillers can include metallic fillers such as lead or its oxides to increase specific gravity. Powdered aluminum can impart higher thermal conductivity, as can other powdered metals such as copper, lead, and bronze, among others.

Phenolic resins are compatible with many organic and inorganic fillers and reinforcements. Thus, reinforcement materials and fillers can be chosen based on one or more desired functions to be elicited from the piston body.

The basic raw materials of phenolic resins include, but are not limited to, formaldehyde (HCHO) and phenol ($C_6H_5OH$). However, any suitable reactive phenol or aldehyde can be used. In some embodiments, phenols can include, but are not limited to, phenol, cresols ($CH_3C_6H_4OH$), xylenols (($CH_3)2C_6H_3OH$), p-t-butylphenol ($C_4H_9C_6H_4OH$), p-phenylphenol ($C_6H_5C_6H_4OH$), bisphenols (($C_6H_4OH)_2$), and resorcinol ($C_6H_4(OH)_2$), among others. The aldehydes can include, but are not limited to, formaldehyde and furfural ($C_4H_3OCHO$).

And, in some embodiments, thermosetting resins can be based on polyphenylene oxide (PPO) chemistry. Depending on the reinforcements and fillers used, a variety of characteristics can be attained using such polyphenylene oxides.

As illustrated in FIG. 2, the piston body 228 can include a proximal end 230 and a distal end 232. The distal end 232 can be shaped to seal the piston chamber and can act as a piston head in the compression process. For example, in embodiments with a circular cylindrical chamber, the distal end 232 can have a circular shape to seal the chamber. One of ordinary skill in the art will appreciate that neither the proximal end 230 nor the distal end 232 are required to have a flat surface in order to seal a piston chamber. Indeed, as will be described in more detail in connection with FIGS. 3A–3D, the piston body 228 have a variety of shapes, lengths, dimensions, etc., as suited to the particular distributional forces and mechanical design rule of a given use or application for a piston configuration.

One guideline in designing the piston body includes providing enough material to secure the piston body 228 to the tang embodiments described above and, resultingly to the yoke. For example, both the proximal and distal ends 230 and 232 can be circular cylindrical, and a middle portion of the piston body can be a different shape, as will be discussed in FIGS. 3A–3D. This shape provides coverage of material for securing the piston body to a tang, such as that shown in FIG. 1A.

By way of example and not by way of limitation, in some embodiments the piston body can include a number of scallops. As used herein, a scallop is a piston body having walls with surfaces defining recessed regions of the piston body 228. For example, as illustrated in FIG. 2, the scalloped surface of the piston body 228 includes walls 242 having surfaces defining a first scallop 236 and a second scallop 238. The first and the second scallop 236 and 238 can extend along the center axis 240 of the piston body 228 from the piston bottom 231 toward the distal end 232 of the piston body 228. In various embodiments, the surface 244 of the scallops can impart rigidity and strength to the piston body 228. In addition, the scalloped surface of the piston body can be positioned around the center axis of the piston body to provide balance to the piston body. For example, as illustrated in FIG. 2, the first and second scallop 236 and 238 can be positioned opposite each other along the center axis 240 of the piston body 228. By positioning the first and second scallop 236 and 238 opposite each other, the first and second scallop 236 and 238 can impart a balance to the piston body 228 along the center axis 240 as the piston body 228 reciprocates within a cylinder bore of a housing as discussed in more detailed on connection with FIG. 6.

As illustrated in FIG. 2, the first scallop 236 includes a surface 244 which extends to the exterior most wall 242 of the piston body 228. The junction between the surface 244 and the exterior most wall 242 and can form a rim 246. The rim can be of any shape. For example, in some embodiments, the rim can include an open circumference along the exterior most wall of the piston body and in other embodiments; the rim can include a closed circumference along the exterior most wall of the piston body. Additionally, the rim can include a non-linear shape, a linear shape, and a combination of both linear and non-linear shapes.

For example, in the embodiment illustrated in FIG. 2, the first and second scallops 236 and 238 include a surface 244 extending radially toward the exterior most wall 242 of the piston body 228 to form the rim 246 of the first and second scallops 236 and 238. In this embodiment, the rim 246 includes an open circumference. That is, the circumference of the rim 246 opens at the intersection between the exterior most wall 242 and the piston bottom 231. As discussed with FIGS. 3A–3D, the shape of the rim 246 can include a combination of a linear portion 248 and a non-linear portion 250. As shown in FIG. 2, the linear portion 248 extends from the piston bottom 231 toward the distal end 232 and begins to curve to form the non-linear portion 250. In some embodiments, at least one piston body groove 234 can be provided proximal the distal end 232. As one of ordinary skill in the art will understand, such grooves can include compression ring grooves, and oil ring grooves, among others.

In FIGS. 3A–3D, various embodiments of the piston body including a scalloped surface are illustrated. Scalloped piston body surfaces can be beneficial in some embodiments because they can provide weight reduction, materials cost reduction, increased piston efficiency, and other such benefits. In these embodiments, only a first scallop 336 is illustrated. However, in each of the embodiments, the piston body can include one or more other scalloped surfaces.

Referring to FIG. 3A, the piston body 328 includes a surface 344 extending radially toward the wall 342 of the piston body 328 to form the rim 346 of the first scallop 336. In this embodiment, the rim 346 of the first scallop 338 includes a closed circumference along the wall 342. That is, the circumference of the rim 346 extends around the wall 342 of the piston body 328 to form the closed circumference. In addition, in this embodiment, the rim is a non-linear shape 350 (e.g., ovular) along the closed circumference.

In various embodiments, the scalloped surfaces can include a rim having a linear shape. For example, as shown in FIG. 3B, a piston body 335 includes a rim 346 having linear portions 348 to form a polygon having eight linear sides with a closed circumference along the wall 342. In other embodiments, the linear portions of the rim can form any number of sides to form any number of polygons.

Alternatively, as illustrated in FIGS. 3C–3D, the first and second scallop can include a rim 346 having an open circumference along the wall 342 of the piston bodies 337 and 339. As discussed above, a rim having an open circumference can also include any shape including linear and non linear shapes. As illustrated in FIG. 3C, the rim 346 of the piston body 337 includes a linear portion 348 and a non-linear portion 350 along the open circumference. In FIG. 3D, the piston body 339 includes a rim 346 having only linear portions 348 along the open circumference of the piston body 339.

FIGS. 3C and 3D further illustrate that the piston bodies can be formed in one or more sectional portions and attached to the tang embodiments described above with a fastener. For example, in FIG. 3C two halves 381 and 383 to the piston body are illustrated. An orifice 385 is illustrated, which can be maintained by a die, to adjoin to the tang embodiments described above. The orifice 385 can have a shape conformal to the shape of the tang to which the piston body 337 will be joined. Another orifice 389 is illustrated to demonstrate a fastener such as a screw can be threaded through a portion of the piston body 337 to attach the piston body to the tang. Similarly, in FIG. 3D, two halves 382 and 384 to the piston body are illustrated. An orifice 385 is again illustrated, which can be maintained by a die, to adjoin to the tang embodiments described above. Another orifice 388 is illustrated to demonstrate once again that a fastener such as a screw can be threaded through a portion of the piston body 339 to attach the piston body to the tang. Embodiments, however, are not limited to such fastener examples. That is, the one or more sectional portions may be attached to the tang embodiments described above via an adhesive or other fastening means.

FIGS. 4A–4D illustrate various embodiments for a piston manufacturing assemblage 460 including a tang according to embodiments of the present invention. Such a piston manufacturing assemblage 460 can be referred to as a pallet. The piston manufacturing assemblage 460 can include a first piston component section 462 having a first tang 464 extending therefrom, and a second piston component section 466 having a second tang 468 extending therefrom. As used herein, a piston component section can include, but is not limited to, a pre-machined portions that can be cut away in subsequent manufacturing steps to further detail a piston component, e.g., a yoke having first and second arms connected via a member, as described in FIG. 1A.

As shown in FIG. 4A, the first and the second piston component sections, 462 and 466, may be connected. In various embodiments, the tangs and the piston component sections can be integrally forged. Embodiments, however, are not so limited to integrally forged tangs and piston component sections. As used herein, integrally forged includes forging the piston manufacturing assemblage in the same forging die such that the piston component sections and the tangs are formed from a single, or the same, forging die. As illustrated in FIG. 4A, additional piston component sections can be connected as part of a manufacturing assemblage 460. By way of example and not by way of limitation, FIG. 4A illustrates a piston manufacturing assemblage 460 that includes a third piston component section 465 having a third tang 467 extending therefrom, and a fourth piston component section 463 having a fourth tang 469 extending therefrom. The tangs include tang embodiments as the same have been described above.

Figure 4B:
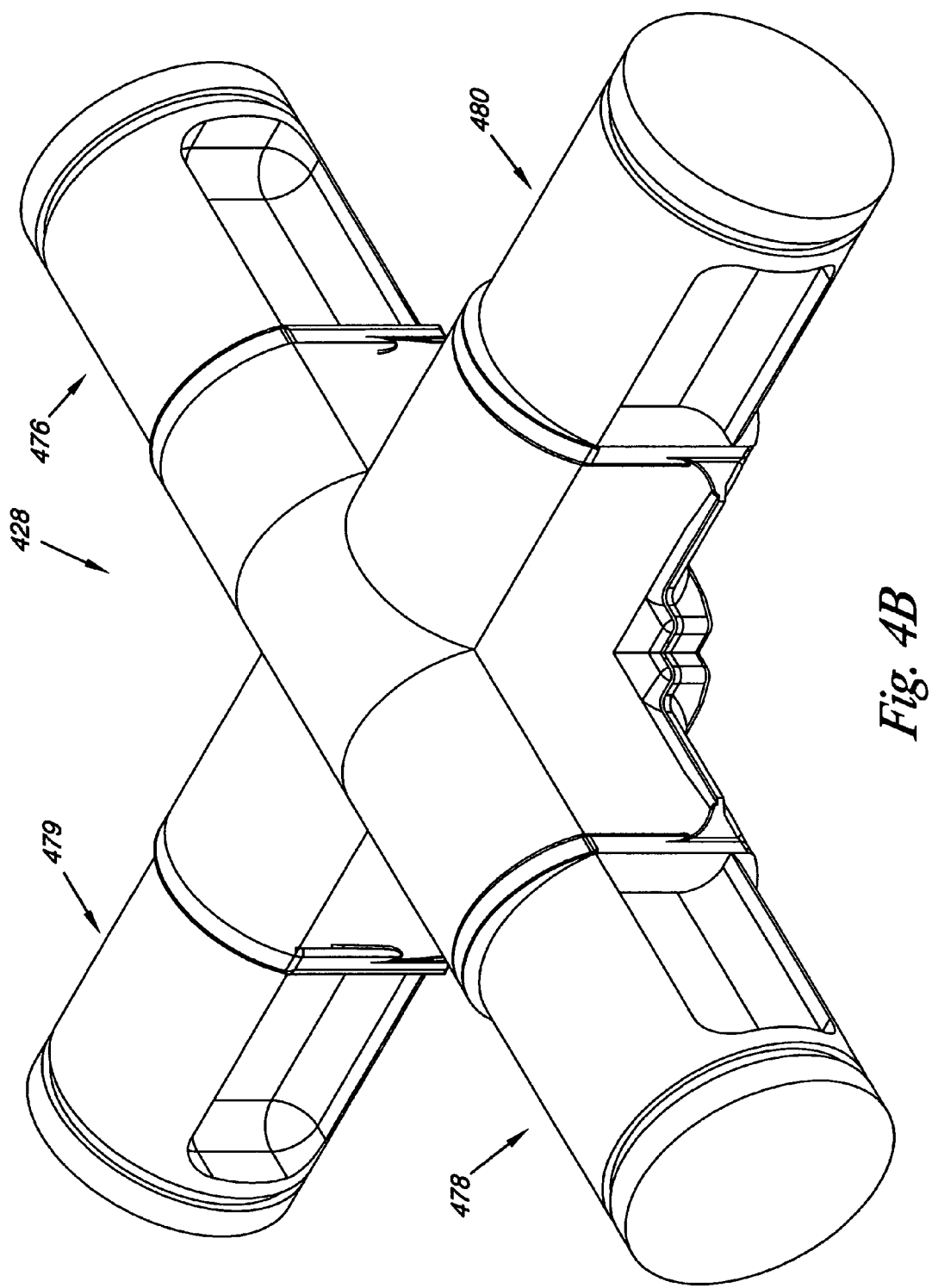

FIG. 4B illustrates a manufacturing assemblage 460, such as illustrated in FIG. 4A, now having piston bodies associated therewith. That is, the piston assembly 460 now has a first piston body 476 formed to the first tang 464, and a second piston body 478 formed to the second tang 468, a third piston body 479 formed to the third tang 467, and a fourth piston body 480 formed to the fourth tang 469. The piston bodies 476, 478, 479, and 480 can include piston bodies formed to a tang as the same have been described herein, e.g., as shown and described in connection with FIG. 2 and FIGS. 3A–3D.

Figure 4C:
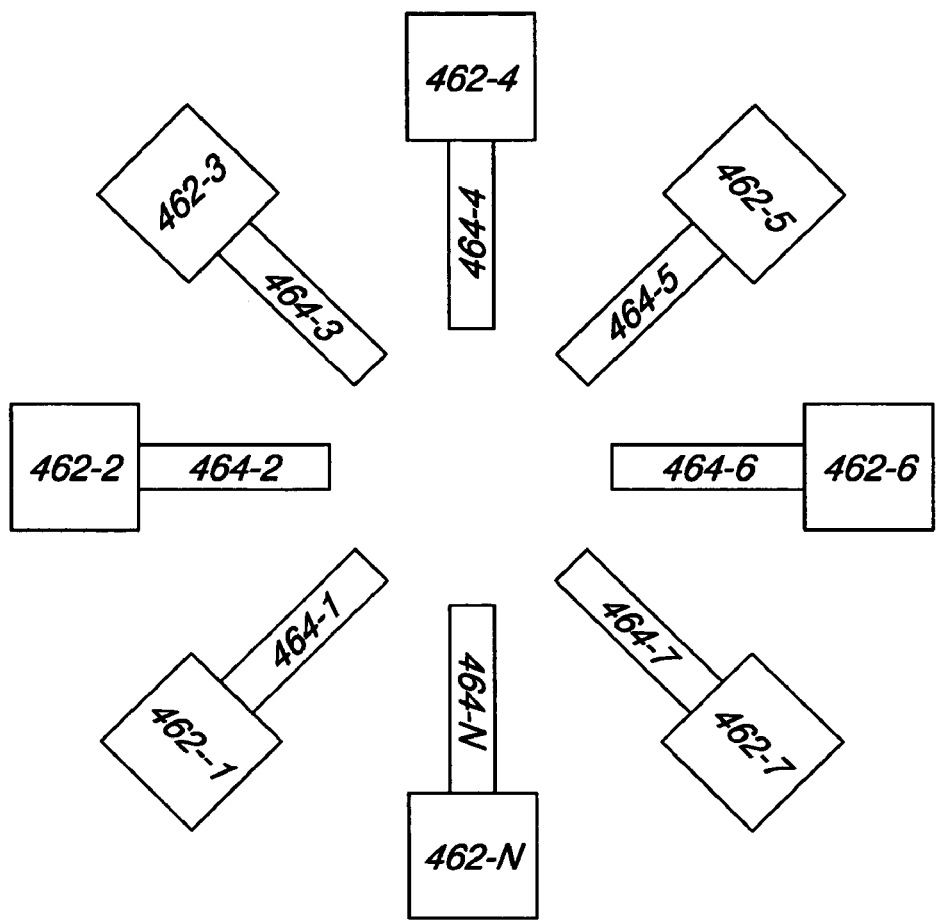

FIG. 4C illustrates that embodiments for a manufacturing assemblage 460, including one or more piston components, 462-1, ... , 462-N, and one or more associated tangs, 464-1, ... , 464-N, according to the embodiments described herein, can be arrayed in an assembly process to face one another during a portion of a manufacturing sequence in which piston bodies, also according to the embodiments described herein, are formed thereto. The designator "N" is used to indicate this embodiments is not limited to a particular number of piston components, 462-1, ... , 462-N, and associated tangs 464-1, ... , 464-N, to be arrayed in an assembly process.

Figure 4D:
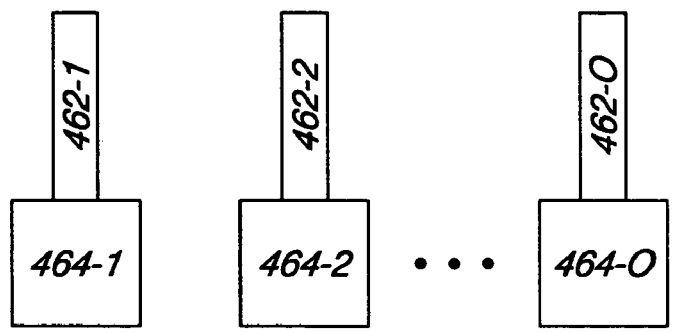

FIG. 4D illustrates that embodiments for a manufacturing assemblage 460, including one or more piston components, 462-1, ... , 462-O, and one or more associated tangs, 464-1, ... , 464-O, according to the embodiments described herein, can be arrayed in an assembly process in an aligned manner, e.g., side by side one another, during a portion of a manufacturing sequence in which piston bodies, also according to the embodiments described herein, are formed thereto. The designator "O" is used to indicate this embodiments is not limited to a particular number of piston components, 462-1, ... , 462-O, and associated tangs 464-1, ... , 464-O, to be arrayed such a manner in an assembly process and to indicate that the number arrayed in this fashion may be different from the number arrayed in the manner illustrated in FIG. 4C.

According to various embodiments, the piston bodies described herein can be formed to the tang using a variety of attachment and/or molding methods, as the same have been mentioned above. Examples of such methods include injection molding, compression molding, and transfer molding, etc. Embodiments, however, are not limited to these forming techniques.

FIG. 5 illustrates example of a device in which a piston component including tang embodiments described herein can be used. That is, FIG. 5 is one example embodiment of a device employing a piston. As the reader will appreciate, a device employing a piston will include a housing with one or more cylinder bore to house a piston. According to the teachings of the present invention the piston can include a piston component having a tang embodiment extending therefrom, as the same have been described herein. A piston body, according to embodiments described herein, can be formed to the tang and positioned for movement within the cylinder bore. In one example such a device is an air conditioning compressor wherein the piston component can be a yoke, the piston body can include a plastic material, and the device can further includes a swash plate for engaging the yoke and for reciprocatingly moving the piston within the cylinder bore.

For ease of illustration, the example embodiment provided in FIG. 5 is a description of a swash plate type compressor 590 incorporating a number of pistons having a piston component with tangs as same have been described herein. Embodiments of the invention, however, are not limited to this illustrative example. Further, those of ordinary skill in the art will appreciate that, although only one piston is shown in FIG. 5, embodiments of the present invention can include compressors having any number of pistons. Additionally, for reasons of simplicity, the compressor illustrated in FIG. 5 does not show many of the parts normally associated with such compressors, but rather is meant to illustrate the motion of a piston embodiment of the present invention.

As illustrated in FIG. 5, the compressor 590 includes a housing 592. In one embodiment, the housing 592 can include a cylinder bore 595 for reciprocably receiving the piston body 528. The compressor 590 includes a yoke 502 having a tang extending therefrom (not shown). As discussed herein, a piston body 528 is formed around the tang and positioned for movement within the cylinder bore 595.

As discussed above, the yoke 502 can include a first arm 504, a second arm 506, and a base 508. As shown in FIG. 5, the yoke includes recesses 510 positioned on opposing surfaces of the first and second arms 506 and 508. As one of ordinary skill will appreciate, a swash plate 594 can be held in engagement with the recesses 510 of the yoke 502 by fitting a pair of shoes 511 within the recesses 510. As shown in FIG. 5, the pair of shoes include hemispherical shaped shoes 511, which are held in the recesses 510 such that the shoes 511 slidably engage the yoke 502 at the inner surfaces 524 and such that the shoes 511 slidably engage the outer portions 598 of the opposite surfaces of the swash plate 594.

In the compressor shown in FIG. 5, a rotary drive shaft 596 is disposed in the housing 592. The rotary drive shaft 596 rotates the swash plate 594. As illustrated in FIG. 5, the swash plate is coupled to the rotary drive shaft 596 and is inclined at an oblique angle to the axis of rotation of the rotary drive shaft 596. As the rotary drive shaft 596 rotates, the swash plate 594 coupled to the rotary drive shaft 596 also rotates. Because the swash plate is inclined at an oblique angle to the axis of rotation of the rotary drive shaft 596, as the swash plate 594 rotates, it imparts a reciprocating motion to the piston, which is positioned parallel to the drive shaft axis. As the rotating swash plate moves the piston body 528 within the cylinder bore 595, refrigerant can be compressed, for example, from a liquid to a gas. The compressed material within the cylinder bore 595 can exit the cylinder bore 595 through a first valve 517. The refrigerant can be recycled and can reenter the cylinder bore via a second valve 519 and the cycle of compressing starts over.

As one of ordinary skill will understand, the swash plate 594 and the rotary drive shaft 596, and other parts of a reciprocating compressor can cooperate with one another to constitute a reciprocating drive action for reciprocating the piston body 528 within the cylinder bore 595.

While the present invention has been shown and described in detail above, it will be clear to the person skilled in the art that changes and modifications may be made without departing from the spirit and scope of the invention. As such, that which is set forth in the foregoing description and accompanying drawings is offered by way of illustration only and not as a limitation. The actual scope of the invention is intended to be defined by the following claims, along with the full range of equivalents to which such claims are entitled.

In addition, one of ordinary skill in the art will appreciate upon reading and understanding this disclosure that other variations for the invention described herein can be included within the scope of the present invention. For example, the piston body and yoke can be used in any piston type compressor.

What is claimed:

1. A piston component, comprising:
   a base having a side to receive a piston body; and
   a tang with a spline along an axis of the tang, wherein the tang extends outward from the side of the base which is to receive the piston body.

2. The piston component of claim 1, further including a piston body formed to the tang.

3. The piston component of claim 2, wherein the piston body includes a moldable material.

4. The piston component of claim 3, wherein the piston body includes a body formed using a liquid resin system.

5. The piston component of claim 3, wherein the piston body is a plastic.

6. The piston component of claim 5, wherein the piston body is a thermoset material.

7. The piston component of claim 6, wherein the thermoset material includes a thermoset composite including at least one of: a phenolic, an unsaturated polyester, thermoset plastic, and a vinyl ester.

8. The piston component of claim 2, wherein the piston body is over molded to the tang.

9. The piston component of claim 2, wherein the piston body is attached to the tang with a fastener.

10. The piston component of claim 2, wherein the piston body includes two halves adhesively attached to the tang.

11. The piston component of claim 1, wherein the tang is formed at an angle to a major surface of the base.

12. A yoke, comprising:
    a base having an arm member, the arm member having a side to receive a piston body;
    a tang with a spline along an axis of the tang, wherein the tang extends outward from the side of the arm which is to receive the piston body; and
    a piston body formed to the tang.

13. The yoke of claim 12, wherein the piston body includes a thermoset material.

14. The yoke of claim 13, wherein the piston body is a composite of the thermoset material and a thermoplastic.

15. The yoke of claim 12, wherein the piston body is over molded to the tang.

16. The yoke of claim 12, wherein the piston body is formed in one or more sectional portions and attached to the tang with a fastener.

17. The yoke of claim 16, wherein the one or more sectional portions are adhesively attached to the tang.

18. The yoke of claim 12, wherein the tang is formed at an angle to a major surface of the arm.

19. The yoke of claim 12, wherein the tang is attached to the arm by an adjustable hinge.

20. The yoke of claim 12, wherein the piston body includes a scalloped surface.

21. The yoke of claim 12, wherein the tang includes a lug positioned along a portion of the tang.

22. A piston, comprising:
    a yoke having a tang extending therefrom, where the tang includes a spline along an axis of the tang; and
    a piston body formed to the tang, wherein the piston body is a plastic.

23. The piston of claim 22, wherein the piston body is a thermoplastic which is over molded to the tang.

24. The piston of claim 22, wherein the piston body is a thermoset composite which is over molded to the tang.

25. The piston of claim 22, wherein the piston body includes a piston body suited for use in a motor.

26. The piston of claim 22, wherein the piston body includes a piston body suited for use in an A/C compressor.

27. The piston of claim 22, wherein the yoke and the tang are integrally formed.

28. A piston manufacturing assemblage, comprising:
    a first piston component section having a first tang extending therefrom, where the first tang includes a spline along an axis of the first tang; and
    a second piston component section having a second tang extending therefrom.

29. The piston manufacturing assemblage of claim 28, wherein the first piston component section and the second piston component section each include an unfinished yoke for a pair of pistons.

30. The piston manufacturing assemblage of claim 28, further including:
    a third piston component section having a third tang extending therefrom; and
    a fourth piston component section having a fourth tang extending therefrom.

31. The piston manufacturing assemblage of claim 30, wherein the first, the second, the third and the fourth piston components are joined.

32. The piston manufacturing assemblage of claim 30, wherein the first, the second, the third and the fourth piston components are arrayed in an assembly process such that the first, the second, the third, and the fourth tangs face one another during a portion of a manufacturing sequence in which piston bodies are formed thereto.

33. The piston manufacturing assemblage of claim 30, wherein the first, the second, the third and the fourth piston components are arrayed in an assembly process such that the first, the second, the third, and the fourth tangs are aligned side by side one another during a portion of a manufacturing sequence in which piston bodies are formed thereto.

34. The piston manufacturing assemblage of claim 28, further including:
    a first piston body formed to the first tang according to an over molding process; and
    a second piston body formed to the second tang according to an over molding process.

35. The piston manufacturing assemblage of claim 28, wherein the first and second piston component sections are, respectively, integrally formed to the first and second tangs.

36. A device employing a piston, comprising:
    a housing including a cylinder bore; and
    a piston including:
        a piston component having a tang extending therefrom, wherein the tang includes a spline along an axis of the tang; and
        a piston body formed to the tang and positioned for movement within the cylinder bore.

37. The device of claim 36, wherein the device is an air conditioning compressor.

38. The device of claim 36, wherein the piston component is a yoke, the piston body includes a plastic material, and the device further includes a swash plate for engaging the yoke and for reciprocatingly moving the piston within the cylinder bore.

39. A piston component, comprising:
a base member having a side;
a tang associated with the side of the base member, wherein the tang includes a spline along an axis of the tang; and
a separately formed piston body, wherein the tang and the side of the base member receive the separately formed piston body.

40. The piston component of claim 39, wherein the tang extends outward from the side of the base member.

41. The piston component of claim 39, wherein the separately formed piston body includes a plastic which is over molded to the tang.

42. The piston component of claim 41, wherein the plastic is a thermoset composite.

43. A method for forming a piston, comprising:
forming a first member having a side to receive a first piston body; and
forming a first tang with a spline along an axis of the first tang, wherein the first tang extends outward from the side of the first member which is to receive the first piston body.

44. The method of claim 43, further including:
forming a second member having a side to receive a second piston body; and
forming a second tang, wherein the second tang extends outward from the side of the second member which is to receive the second piston body.

45. The method of claim 44, wherein the first member, the second member, the first tang, and the second tang are forged in a single forging die.

46. The method of claim 44, further including over molding a first piston body to the first tang and concurrently over molding a second piston body to the second tang.

* * * * *